(12) United States Patent
Sarin (10) Patent No.: US 12,530,570 B2
(45) Date of Patent: Jan. 20, 2026

(54) METHODS AND SYSTEMS OF OPERATING A NEURAL CIRCUIT IN A NON-VOLATILE MEMORY BASED NEURAL-ARRAY

(71) Applicant: Vishal Sarin, Santa Clara, CA (US)

(72) Inventor: Vishal Sarin, Santa Clara, CA (US)

(*) Notice: Subject to any disclaimer, the term of this patent is extended or adjusted under 35 U.S.C. 154(b) by 630 days.

(21) Appl. No.: 17/882,341

(22) Filed: Aug. 5, 2022

(65) Prior Publication Data

US 2023/0082240 A1  Mar. 16, 2023

Related U.S. Application Data

(62) Division of application No. 16/452,308, filed on Jun. 25, 2019, now Pat. No. 12,136,028.
(Continued)

(51) Int. Cl.
*G06N 3/063* (2023.01)
*G06F 7/499* (2006.01)
(Continued)

(52) U.S. Cl.
CPC .......... *G06N 3/063* (2013.01); *G06F 7/49942* (2013.01); *G06F 17/16* (2013.01);
(Continued)

(58) Field of Classification Search
None
See application file for complete search history.

(56) References Cited

U.S. PATENT DOCUMENTS

| 2007/0045711 A1* | 3/2007 | Bhattacharyya | H10D 64/037 257/E21.21 |
| 2014/0059406 A1* | 2/2014 | Hyun | G11C 11/5642 714/773 |

(Continued)

OTHER PUBLICATIONS

Donato et al., "On-chip Deep Neural Network Storage with Multi-Level eNVM" (Jun. 24, 2018) (Year: 2018).*
(Continued)

*Primary Examiner* — Shahid K Khan
*Assistant Examiner* — Beatriz Ramirez Bravo (57) ABSTRACT

In one aspect, a method of a neuron circuit includes the step of providing a plurality of $2^N-1$ single-level-cell (SLC) flash cells for each synapse ($Y_i$) connected to a bit line forming a neuron. The method includes the step of providing an input vector ($X_i$) for each synapse $Y_i$ wherein each input vector is translated into an equivalent electrical signal $ES_i$ (current $I_{DACi}$, pulse $T_{PULSEi}$, etc). The method includes the step of providing an input current to each synapse sub-circuit varying from $2^0*ES_i$ to $(2^N-1)*ES_i$. The method includes the step of providing a set of weight vectors or synapse ($Y_i$), wherein each weight vector is translated into an equivalent threshold voltage level or resistance level to be stored in one of many non-volatile memory cells assigned to each synapse ($Y_i$). The method includes the step of providing for $2^N$ possible threshold voltage levels or resistance levels in the $2^N-1$ non-volatile memory cells of each synapse, wherein each cell is configured to store one of the two possible threshold voltage levels. The method includes the step of converting the N digital bits of the weight vector or synapse $Y_i$ into equivalent threshold voltage level and store the appropriate cell corresponding to that threshold voltage level in one of the many SLC cells assigned to the weight vector or synapse ($Y_i$). The method includes the step of turning off all remaining $2^N-1$ flash cells of the respective synapse ($Y_i$). Various other methods are presented of forming neuron circuits by providing a plurality of single-level-cell (SLC) and many-level-cell (MLC) non-volatile memory cells, for each synapse ($Y_i$) electrically connected to form a neuron. The disclosure shows methods of forming neurons in various configurations for non-volatile memory cells (flash, RRAM etc.); of different storage capabilities per cell—both SLC and MLC cells.

5 Claims, 11 Drawing Sheets

Related U.S. Application Data (60) Provisional application No. 62/803,562, filed on Feb. 10, 2019, provisional application No. 62/773,773, filed on Nov. 30, 2018, provisional application No. 62/721,116, filed on Aug. 22, 2018, provisional application No. 62/689,839, filed on Jun. 26, 2018.

(51) Int. Cl.
*G06F 17/16* (2006.01)
*G06N 3/04* (2023.01)
*G06N 3/049* (2023.01)
*G06N 3/065* (2023.01)
*G06N 3/082* (2023.01)

(52) U.S. Cl.
CPC .............. *G06N 3/04* (2013.01); *G06N 3/049* (2013.01); *G06N 3/065* (2023.01); *G06N 3/082* (2013.01)

(56) References Cited

U.S. PATENT DOCUMENTS

| | | | |
|---|---|---|---|
| 2014/0380129 A1* | 12/2014 | Shin | G06F 11/1048 714/773 |
| 2016/0148701 A1* | 5/2016 | Karakulak | G11C 16/3427 365/185.18 |
| 2017/0269669 A1* | 9/2017 | Choi | G06F 3/0688 |
| 2018/0314927 A1* | 11/2018 | Muralimanohar | G06N 3/063 |
| 2019/0287631 A1* | 9/2019 | Tran | G06N 3/08 |

OTHER PUBLICATIONS

Renesas Application Note, "Basic DACs for Electronic Engineers" (Jul. 1997) (Year: 1997).*

* cited by examiner

Provide a plurality of $2^N-1$ single-level-cell (SLC) flash cells for each synapse ($Y_i$) connected to a bit line forming a neuron
402

Provide an input vector $X_i$ for each synapse $Y_i$ wherein each input vector is translated into an equivalent current $I_{DACi}$
404

Provide an input current to each synapse sub-circuit varying from $2^0 * I_{DACi}$ to $(2^N-1)*I_{DACi}$
406

Provide a set of weight vectors or synapse ($Y_i$), wherein each weight vector is translated into an equivalent threshold voltage level to be stored in one of many SLC flash cells assigned for each synapse
408

Provide for $2^N$ possible threshold voltage levels in the $2^N-1$ flash cells of each synapse. Each flash cell is capable of storing one of the two possible threshold voltage levels
410

Convert the N digital bits of the weight vector or synapse $Y_i$ into equivalent threshold voltage level and store the appropriate cell corresponding to that threshold voltage level in one of the many SLC cells assigned to the weight vector or synapse $Y_i$
412

Turn off all remaining $2^N-1$ flash cells of the respective synapse ($Y_i$)
414

Repeat the same 402 – 414 for each synapse forming the neuron
416

```
┌─────────────────────────────────────────────────────────────────────┐
│ Provide a plurality of N many-level-cell (MLC) flash cells for each │
│ synapse ($Y_i$) connected to a bit line forming a neuron            │
│                              602                                    │
└─────────────────────────────────────────────────────────────────────┘
                                  ▼
┌─────────────────────────────────────────────────────────────────────┐
│ Provide an input vector $X_i$ for each synapse $Y_i$ wherein each   │
│ input vector is translated into an equivalent current               │
│                              604                                    │
└─────────────────────────────────────────────────────────────────────┘
                                  ▼
┌─────────────────────────────────────────────────────────────────────┐
│ Provide an input current to each synapse sub-circuit equal to       │
│ $I_{DACi}$                                                          │
│                              606                                    │
└─────────────────────────────────────────────────────────────────────┘
                                  ▼
┌─────────────────────────────────────────────────────────────────────┐
│ Provide a set of weight vectors ($Y_i$) and each weight vector is   │
│ translated into an equivalent threshold voltage level to be stored  │
│ in one of many MLC flash cells                                      │
│                              608                                    │
└─────────────────────────────────────────────────────────────────────┘
                                  ▼
┌─────────────────────────────────────────────────────────────────────┐
│ Provide for $2^N$ possible threshold voltage levels in the          │
│ $(2^N-1)/(L-1)$ flash cells of each synapse                         │
│                              610                                    │
└─────────────────────────────────────────────────────────────────────┘
                                  ▼
┌─────────────────────────────────────────────────────────────────────┐
│ Convert the N digital bits of the weight vector $Y_i$ into          │
│ equivalent threshold voltage level and store the appropriate cell   │
│ corresponding to that threshold voltage level                       │
│                              612                                    │
└─────────────────────────────────────────────────────────────────────┘
                                  ▼
┌─────────────────────────────────────────────────────────────────────┐
│ If weight level (W) is in 0 to L-1, then process 600 can store W in │
│ the least significant flash cell and turn off the other flash cells │
│ forming the synapse                                                 │
│                              614                                    │
└─────────────────────────────────────────────────────────────────────┘
                                  ▼
                                 (A)
```

METHODS AND SYSTEMS OF OPERATING A NEURAL CIRCUIT IN A NON-VOLATILE MEMORY BASED NEURAL-ARRAY

CROSS-REFERENCE TO RELATED APPLICATIONS

This application is a divisional of U.S. patent application Ser. No. 16/452,308 filed on Jun. 25, 2019 and titled METHODS AND SYSTEMS OF OPERATING A NEURAL CIRCUIT IN A NEURAL-ARRAY BASED FLASH MEMORY. This application is hereby incorporated by reference in its entirety.

U.S. patent application Ser. No. 16/452,308 claims priority to U.S. provisional patent application No. 62/689,839, titled FORMING NEURONS WITH USING SLC FLASH CELLS and filed on 26 Jun. 2018. This application is hereby incorporated by reference in its entirety.

This application claims priority to U.S. provisional patent application No. 62/721,116, titled METHODS AND SYSTEMS OF NEURAL-ARRAY BASED FLASH MEMORY and filed on 22 Aug. 2018. This application is hereby incorporated by reference in its entirety.

U.S. patent application Ser. No. 16/452,308 claims priority to U.S. provisional patent application No. 62/803,562, titled DIFFERENT FLASH CELLS FOR NEURONS and filed on 2 Feb. 2019. This application is hereby incorporated by reference in its entirety.

U.S. patent application Ser. No. 16/452,308 claims priority to U.S. provisional patent application No. 62/773,773, titled FORMING NEURONS WITH USING SLC FLASH CELLS and filed on 30 Nov. 2018. This application is hereby incorporated by reference in its entirety.

BACKGROUND

1. Field

This application relates generally to electronic circuits, and more particularly to a system, method and article of manufacture of operating a neural circuit in a neural-array based non-volatile memory such as flash memory. Neural networks are increasingly used for various use cases for artificial intelligence such as vision analysis—object detection, tracking etc.; natural language processing; anomaly detection on a range of devices; analysis on industrial and medical sensors; and many other such applications. A key element of neural network computing is to enable trillions of multiply-add operations which make it very compute and power hungry.

2. Related Art

Solutions available today use CPU's and GPU's to implement and accelerate neural network models in hardware. Improvements are desired in neural network hardware accelerators to improve performance and reduce power consumption. The implementation techniques for neural networks presented in the current invention enables such compute operations at very high-performance levels while consuming very low energy. This opens up the possible applications which can benefit from neural networks.

BRIEF SUMMARY OF THE INVENTION

In one aspect, a method of a neuron circuit includes the step of providing a plurality of $2^N-1$ single-level-cell (SLC) flash cells for each synapse ($Y_i$) connected to a bit line forming a neuron. The method includes the step of providing an input vector ($X_i$) for each synapse $Y_i$ wherein each input vector is translated into an equivalent current $I_{DACi}$. The method includes the step of providing an input current to each synapse sub-circuit varying from $2^0 * I_{DACi}$ to $(2^N-1) * I_{DACi}$. The method includes the step of providing a set of weight vectors or synapse ($Y_i$), wherein each weight vector is translated into an equivalent threshold voltage level to be stored in one of many SLC flash cells assigned to each synapse ($Y_i$). The method includes the step of providing for $2^N$ possible threshold voltage levels in the $2^N-1$ flash cells of each synapse, wherein each flash cell is configured to store one of the two possible threshold voltage levels. The method includes the step of converting the N digital bits of the weight vector or synapse $Y_i$ into equivalent threshold voltage level and store the appropriate cell corresponding to that threshold voltage level in one of the many SLC cells assigned to the weight vector or synapse ($Y_i$). The method includes the step of turning off all remaining $2^N-1$ flash cells of the respective synapse ($Y_i$). It can be noted by those skilled in the art that input current $I_{DACi}$ can be replaced by input pulse $T_{PULSEi}$ and that flash cells can be replaced by other non-volatile memory cells having threshold voltage or resistance levels.

In another aspect, a method of A method for operating analog flash cell neurons includes the step of providing a plurality of N many-level-cell (MLC) flash cells for each synapse (Yi) connected to a bit line forming a neuron, wherein the plurality of flash cells are ordered from a most significant levels (MSLs) to a least significant levels (LSLs), and wherein N is the number of bits in the weight vector or synapse ($Y_i$). The method includes the step of providing an input vector ($X_i$) for each synapse ($Y_i$), wherein each input vector ($X_i$) is translated into an equivalent current. The method includes the step of providing an input current ($I_{DACi}$) to each synapse sub-circuit equal to input current ($I_{DACi}$). The method includes the step of providing a set of weight vectors ($Y_i$). Each weight vector is translated into an equivalent threshold voltage level to be stored in one of many MLC flash cells assigned for each synapse. The method includes the step of providing for $2^N$ possible threshold voltage levels in the $(2^N-1)/(L-1)$ flash cells of each synapse, wherein each flash cell is configured to store L possible threshold voltage levels, one of which is zero. The method includes the step of converting the N digital bits of the weight vector $Y_i$ into equivalent threshold voltage level and store the appropriate cell corresponding to that threshold voltage level in one of the many SLC cells assigned to the weight vector or synapse $Y_i$. It can be noted by those skilled in the art that input current $I_{DACi}$, can be replaced by input pulse $T_{PULSEi}$ and that flash cells can be replaced by other non-volatile memory cells having threshold voltage or resistance levels.

In yet another aspect, a method for operating a set of many level cell (MLC) flash cells in a neuron comprising includes the step of providing a plurality of N/B many level cell (MLC) flash cells for each synapse ($Y_i$) connected to a bit line forming a neuron, wherein the plurality of flash cells are ordered from a most significant bit (MSB) to a least significant bit (LSB), and N is the number of bits in the weight vector or synapse ($Y_i$) and B is the bit storage per flash cell. The method includes the step of providing an input vector ($X_i$) for each synapse ($Y_i$). Each input vector ($X_i$) is translated into an equivalent current; providing an input current $I_{DACi}$ to each synapse sub-circuit, from $(2^{0*k}) * I_{DACi}$, $(2^{1*k}) * I_{DACi}$, $(2^{2*k}) * I_{DACi}$. $k = \log_2(L)$. L is the number of levels possible per flash cell and k=B. The method includes the step of providing a set of weight vectors. Each weight vector is stored in one of many MSB to LSB MLC flash cells assigned to each synapse ($Y_i$). The method includes the step of storing the N digital bits of the weight vector, such that B bits are stored in each flash cell, in order of significance from LSB to MSB. It can be noted by those skilled in the art that input current $I_{DA}c$, can be replaced by input pulse $T_{PULSEi}$ and that flash cells can be replaced by other non-volatile memory cells having threshold voltage or resistance levels.

BRIEF DESCRIPTION OF THE DRAWINGS

The Figures described above are a representative set and are not an exhaustive with respect to embodying the invention.

DESCRIPTION

Disclosed are a system, method, and article of manufacture of operating a neural circuit in a neural-array based flash memory. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of flow charts for weight mapping and operations, example processes, hardware circuits etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Analog-to-digital converter (ADC) is a system that converts an analog into a digital signal.

Digital-to-analog converter (DAC) is a system that converts a digital signal into an analog signal.

Flash memory is an electronic solid-state non-volatile storage medium that can be electrically erased and reprogrammed.

Least significant bit (LSB) can be the bit with the lowest significance in a word.

Metal-oxide-semiconductor field-effect transistor (MOSFET) is a type of field-effect transistor (FET). It can have an insulated gate; whose voltage determines the conductivity of the device. This ability to change conductivity with the amount of applied voltage can be used for amplifying or switching electronic signals.

Most significant bit (MSB) can be the bit with the highest significance in a word.

Neuron can be a non-volatile memory cell system, with preferred embodiment being a flash-cell system modelled on attributes of individual neurons and networks of neurons in a nervous system. In some examples, the equation for a neuron can be:

$$\text{Neuron Equation} = \sum_{i=1}^{z} Xi * Yi + bias$$

Here, $X_i$ is the set of input vectors, $Y_i$ is a parameter which can be related to the threshold voltage of individual flash cells or resistance of non-volatile memory cells; and b is a bias variable.

NMOS can be an n-channel MOSFET.

Neural synapse is an element of a neuron. A neuron can have a set of N synapses. Each $X_i*Y_i$ is an $i^{th}$ synapse of the neuron where $X_i$ is the input and $Y_i$ is the weight of the synapse. For example, $X_1*Y_1$ is a $1^{st}$ synapse of the neuron, where $X_1$ is the first input vector and $Y_1$ is the weight of the first synapse. The weight can be stored in one or more non-volatile memory cells or flash cells forming a synapse. These non-volatile memory cells or flash cells are connected to form a synapse and a neuron can be implemented by connecting one or more synapses.

PMOS can be a p-channel MOSFET.

A non-volatile memory cell is a storage element for storing analog or digital information in the form of threshold voltage values/levels or resistance values/levels which can be interpreted as data. The data is retained and retrievable even after loss of power supply to the cell. Flash cells, resistive ram cells (RRAM), magnetic ram cells (MRAM) etc. are all examples of non-volatile memory technology.

Select device can act as a switch that connects/shorts a pair of nodes when turned on.

Example Architecture And Systems

Figure 1A:
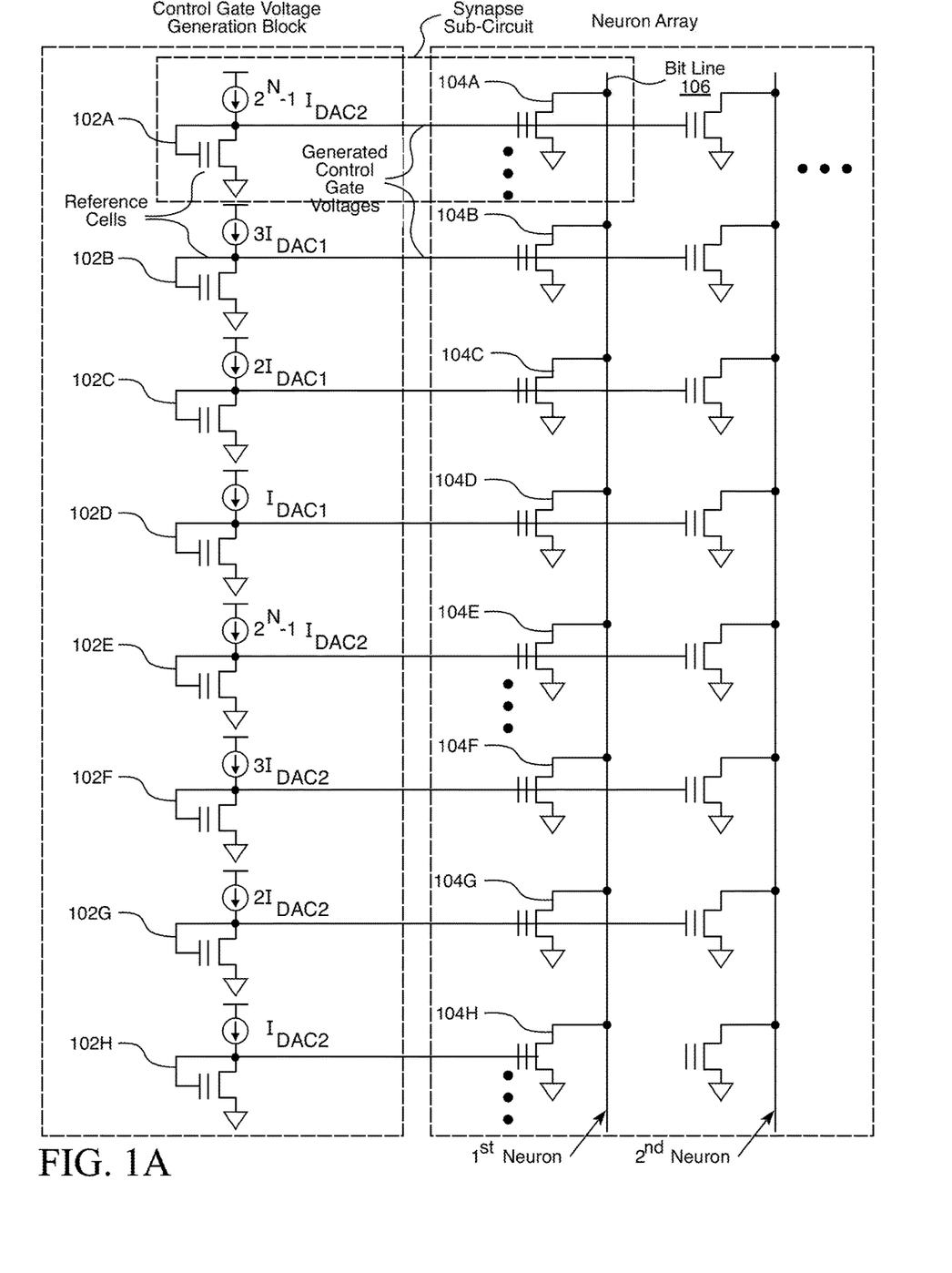
FIGS. 1A-B illustrate a set of example systems for forming neurons using single-level cell (SLC) flash cells or other non-volatile cells, according to some embodiments.
Figure 1B:
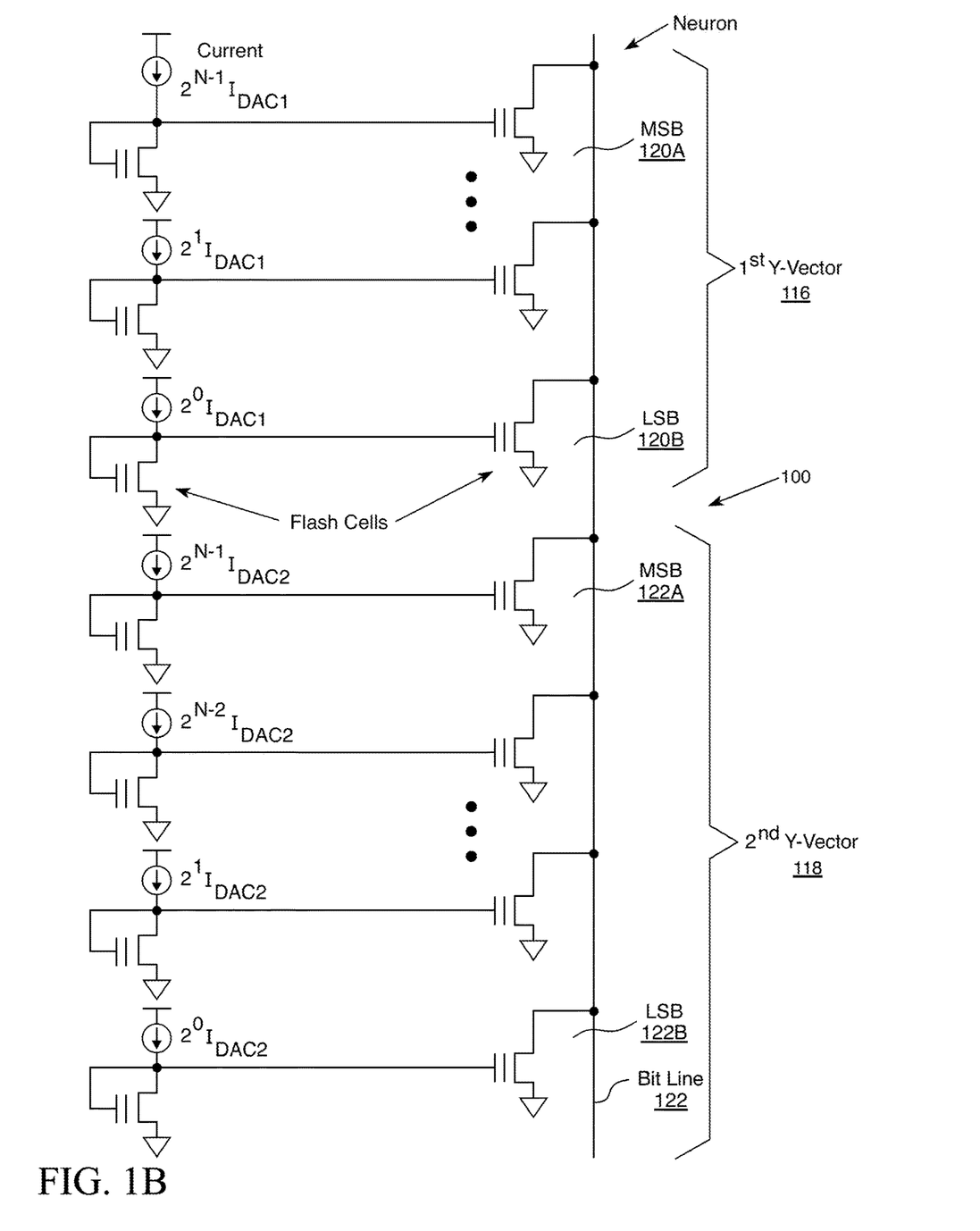

FIGS. 1A-B illustrate an example first system 100 for forming neurons (e.g. neural circuits) using single-level cell (SLC) flash cells, according to some embodiments. System 100 can provide a single bit of digital information per flash cell. An SLC flash cell can stores data in individual memory cells (e.g. made of floating-gate transistors). In some examples, each cell can have two possible states such that one bit of data is stored in each SLC flash cell. The SLC flash cells of system 100 can be used to generate a neuron. It can be noted by those skilled in the art that input current $I_{DACi}$ can be replaced by input pulse $T_{PULSEi}$ and that flash cells can be replaced by other non-volatile memory cells having threshold voltage or resistance levels.

The neuron equation is provided as follows:

$$\text{Neuron Equation} = \sum_{i=1}^{z} Xi * Yi + bias$$

As shown in FIG. 1A, $X_i$ is the set of input vectors. Each $X_i$-input vector is translated into an equivalent current (e.g. $I_{DAC}$, etc. For example, in FIG. 1A, flash cells 102 A-H receive an equivalent $I_{DACi}$ current as shown.

A neuron can have a specified number of levels. There are N bits in an $X_i$ vector. B is the number of bits per neuron. L is the number of levels per non-volatile memory or flash and $L=2^B$. For example, for two levels per cell then: $L=2$ and $B=1$.

$Y_i$ is the set of parameters of weight vectors (e.g. as provided by flash cells 104 A-H) and each $Y_i$ is a parameter which can be related to threshold voltage for an individual flash cell or resistance in other non-volatile memory cells. The analog weight of $Y_i$ is translated into N digital bits. Each digital bit is stored in a memory cell from MSB (e.g. 120 A-B) to LSB (122 A-B). Each weight vector can be stored as a threshold voltage ($V_t$) of a flash cell. Each $X_i \cdot Y_i$ combination forms a synapse. The synapses are coupled with bit line 106. Bit line 106 receives a specified output from the neuron as provided by the neuron equation. Bias is the bias variable of the equation. Bias can be set as a fixed bias current per bit line. The flash cells can be NMOS or PMOS flash cells. In this way, system 100 illustrates an example of the application of these properties for forming neurons using SLC flash cells. It can be noted by those skilled in the art that input current $I_{DACi}$ can be replaced by input pulse $T_{PULSEi}$ and that flash cells can be replaced by other non-volatile memory cells having threshold voltage or resistance levels.

FIG. 1B illustrates an example embodiment of forming neural circuits using single-level cell (SLC) flash cells, according to some embodiments. The example neural circuit has two example vectors $X_1*Y_1$ 116 and $X_2*Y_2$ 118. Vector 116 includes an MSB level 120A and a least significant bit LSB level 122A. Vector 118 includes an MSB level 122B and a least significant bit LSB level 122B. It can be noted by those skilled in the art that input current $I_{DACi}$ can be replaced by input pulse $T_{PULSEi}$ and that flash cells can be replaced by other non-volatile memory cells having threshold voltage or resistance levels.

Figure 2A:
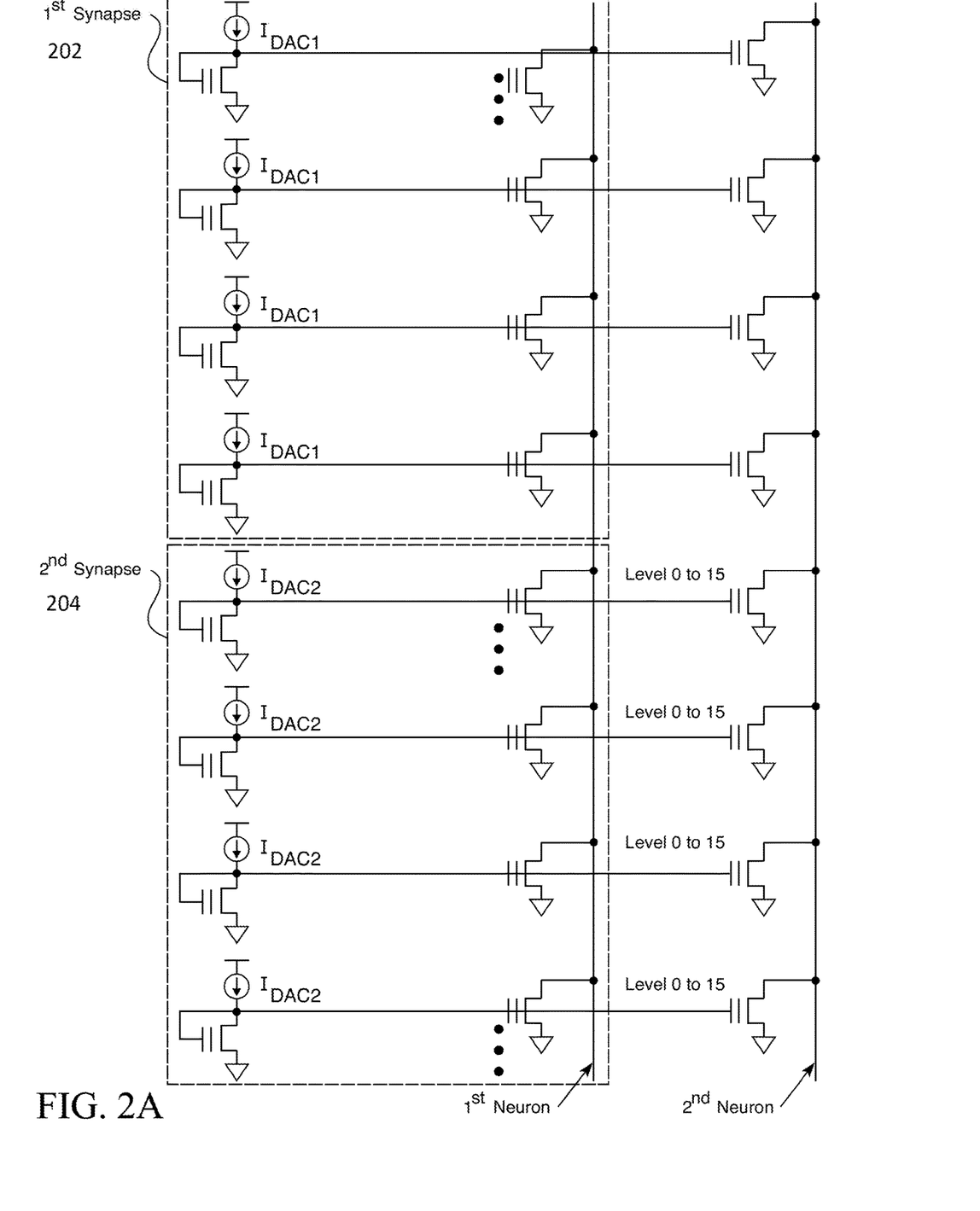
FIGS. 2A-C illustrate an example process for improving weight resolution for analog or many-level-cell (MLC) non-volatile memory cell, especially flash cell neurons, according to some embodiments.
Figure 2B:
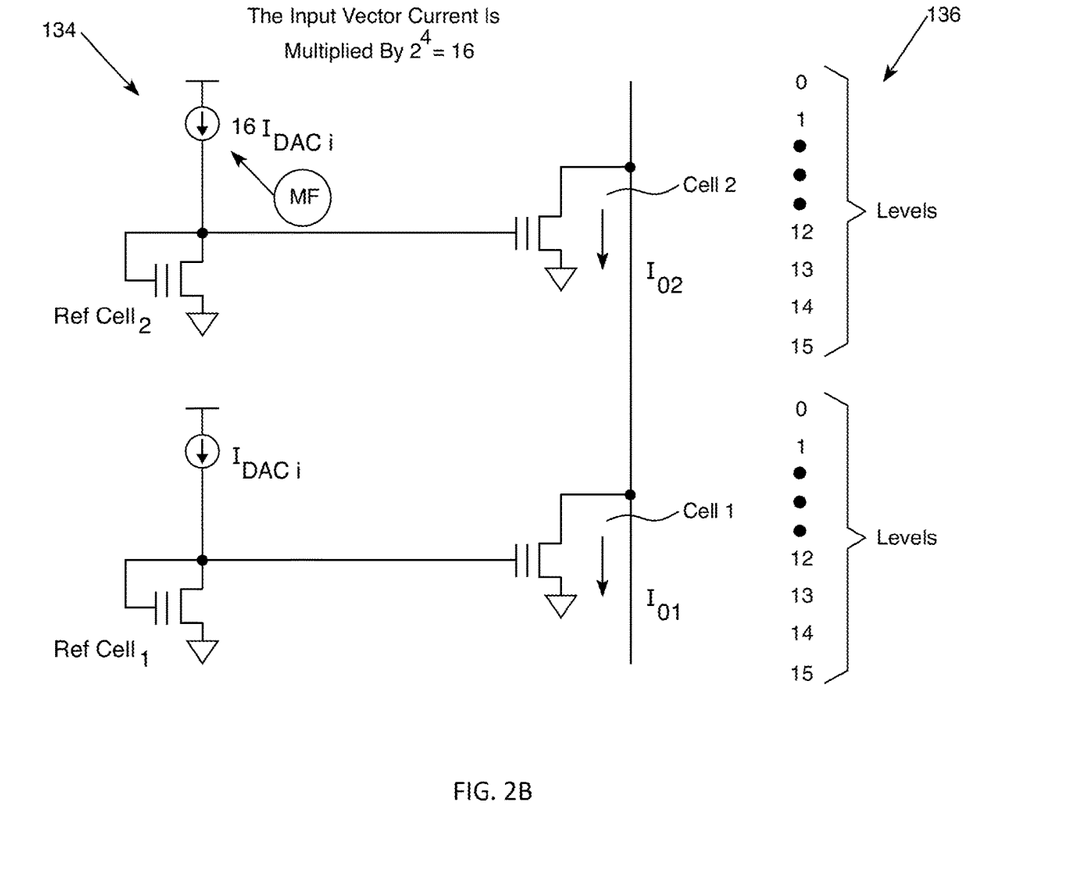
Figure 2C:
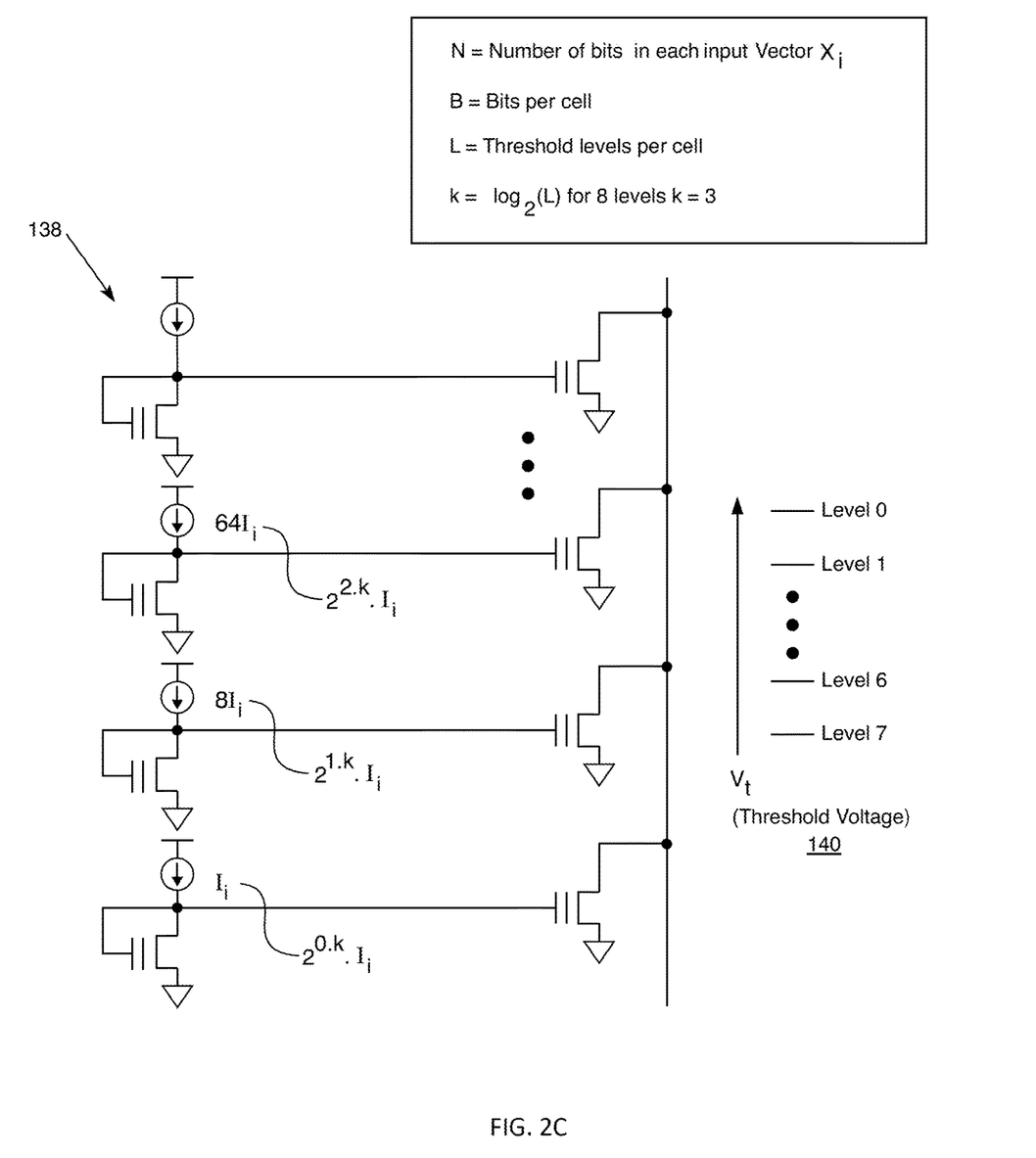

FIGS. 2A-C illustrate an example system 200 for improving weight resolution for analog flash cell neurons, according to some embodiments. More specifically, FIG. 2A includes a first synapse 202. Synapse 202 can include various configurations of synapse sub-circuits. In the present example, four synapse sub-circuits are provided by way of example. Each of the flash cells can have 16 levels, one of which is level 0. The inputs to synapse 202 and 204 are all $I_{DAC1}$. In this way, each flash cell can handle 4 bits. In one example, an input vector can be 1011. This translates to 43. Levels and not bits are input in the flash cell. Accordingly, level 43 is selected. In one example, 15 of the 43 levels can be put into a first flash cell of synapse 204 and another 15 of the 43 levels can be put into a second flash cell of synapse 204 and 13 of the 43 levels can be put in a third cell of synapse 204. The fourth cell can be turned off. The input is additive in levels of synapses 202-204. The input current is then multiplied by levels of the flash cells: $15 \times I_{DAC1} + 15 \times I_{DAC1} + 13 \times I_{DAC1} + 0 \times I_{DAC1} = 43 I_{DAC1}$. It can be noted by those skilled in the art that input current $I_{DACi}$ can be replaced by input pulse $T_{PULSEi}$ and that flash cells can be replaced by other non-volatile memory cells having threshold voltage or resistance levels.

In one example embodiment, as shown in FIG. 2B, M can be set to sixteen (16). In this case, then the sixteen (16) levels are related to four (4) bits (e.g. 0, 1, . . . , $2^4$) per many-level-cell (MLC). It is noted that MLC cell (e.g. an analogue cell) can mean more than two levels. Here, two-hundred and fifty-six levels (e.g. 0 to 255) are represented by two (2) cells of sixteen (16) levels each as shown. A combined output current of $I_{O1} + I_{O2}$ is generated. Accordingly, this current represents 0 to 255 different threshold levels represented by two (2) cells of sixteen (16) levels each. In one example, while programming a weight value of seventeen (17), then level one (1) of cell two (2) (e.g. $I_{DAC1}*16$) and level one (1) of cell one (1) (e.g. $I_{DAC1}*1$) can be selected. Here the multiplication factor (MF) is sixteen (16) for cell two. System 200 can select different MF values to obtain a number of effective levels.

For example, if $Y_1=1011$, this translated to translates to level 11. If $X_1=1010$, this is translated to level $10=I_{DAC1}$. In one example, if there are 0-15 levels and the output is to 43, then level 2 which the 2nd MLC and on 1st MLC storing level 11 are selected. This provides: $(I_{DAC1} \times 11)+(16_{IDAC1} \times 2)=43_{IDAC1}$.

FIG. 2C illustrates a general rule example. Here, W is weight vector Yi translated to equivalent threshold or resistance level; L=number of levels that can be fit into a flash cell (e.g. flash cells 134, 138); B is the number of bits which can fit into a cell and equals $\log_2(L)$; X=N/B which number of flash cells provided for storing the weight of the synapse; It is noted that that the number of flash cells can be reduced by multiplying the input vector current by a specified factor.

Figure 3:
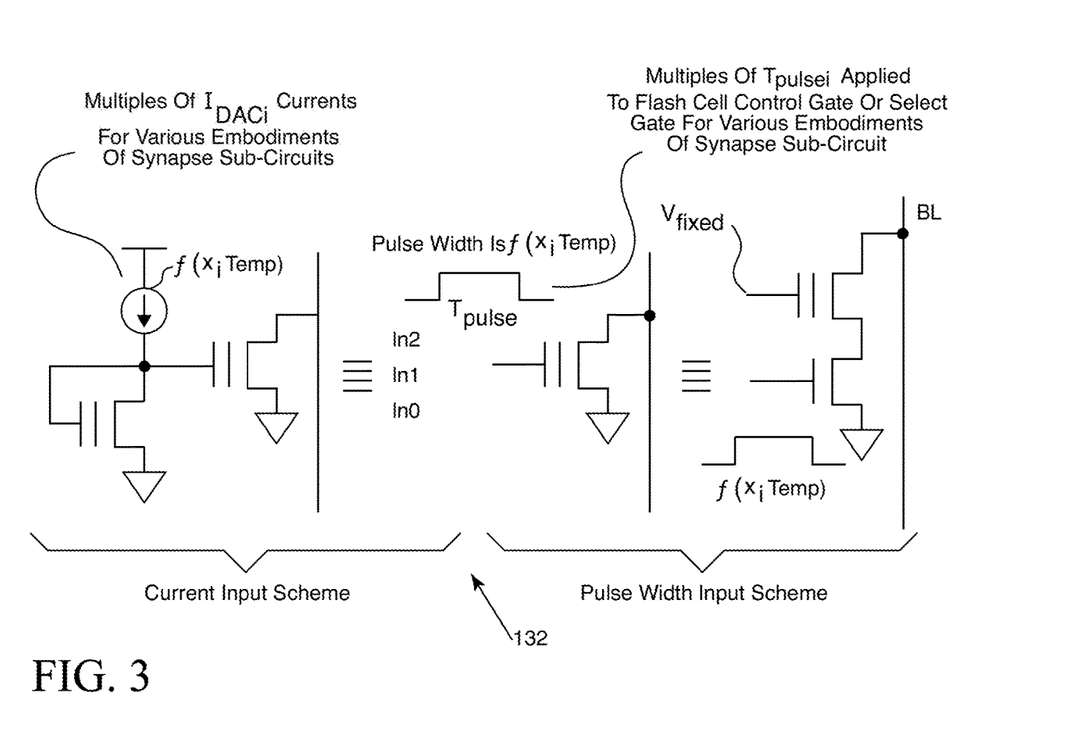
FIG. 3 illustrates another scheme of generating input into a neural non-volatile memory cells, especially flash cells according to some embodiments.

FIG. 3 illustrates another scheme of generating input into a neural flash cell 132 according to some embodiments. Two different embodiments are shown by way of example. In one embodiment, the input $X_i$ can be a current (and/or multiples of currents) translated to intermediate voltage and provided to a control-gate of flash cell. The current can be $I_{DAC}$. In another embodiments, the input can be given as a pulse (and/or multiples of pulses) to the select-gate or the control gate of the flash cell. The pulse width is a function $X_i$. The weight levels can be distributed into multiple cells as explained in the embodiments of the invention previously.

Example Processes

Figure 4:
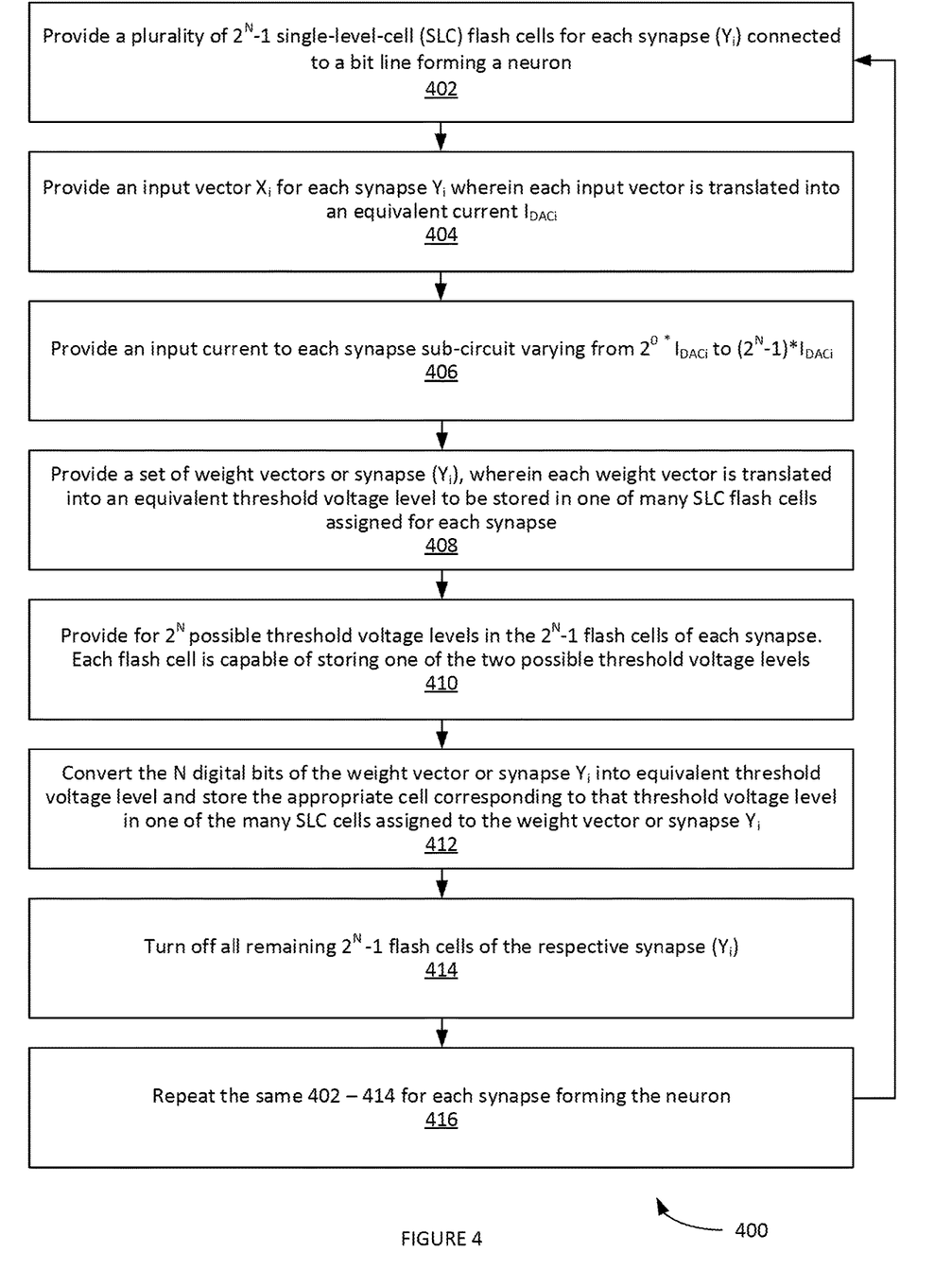
FIG. 4 illustrates an example process for operating neurons using single-level-cell (SLC) non-volatile memory cells and especially flash cells, according to some embodiments.

FIG. 4 illustrates an example process 400 for operating neurons using single-level cell (SLC) flash cells, according to some embodiments. In step 402, process 400 can provide a plurality of $2^N-1$ single-level-cell (SLC) flash cells for each synapse ($Y_i$) connected to a bit line forming a neuron. In the neuron(s), the plurality of flash cells is ordered from a most significant level (MSL) to a least significant level (LSL). N is the number of bits in the weight vector or synapse $Y_i$.

It is noted that MSL can be a most significant level when a binary code is converted to analog levels. For an N-bit vector, 0 is the LSB and N−1 is the MSB, 0 is the LSL and $(2^N)-1$ is the MSL.

In step 404, process 400 can provide an input vector $X_i$ for each synapse $Y_i$ wherein each input vector is translated into an equivalent current $I_{DACi}$. In step 406, process 400 can provide an input current to each synapse sub-circuit varying from $2^0 * I_{DACi}$ to $(2^N-1) * I_{DACi}$.

In step 408, process 400 can provide a set of weight vectors or synapse ($Y_i$). Each weight vector is translated into an equivalent threshold voltage level to be stored in one of many SLC flash cells assigned for each synapse. In step 410, process 400 can provide for $2^N$ possible threshold voltage levels in the $2^N-1$ flash cells of each synapse. Each flash cell is capable of storing one of the two possible threshold voltage levels.

In step 412, process 400 can convert the N digital bits of the weight vector or synapse $Y_i$ into equivalent threshold voltage level and store the appropriate cell corresponding to that threshold voltage level in one of the many SLC cells assigned to the weight vector or synapse $Y_i$.

In step 414, process 400 can turn off all remaining $2^N-1$ flash cells of the respective synapse ($Y_i$). In step 416, process 400 can repeat the same 402-414 for each synapse forming the neuron.

Figure 5:
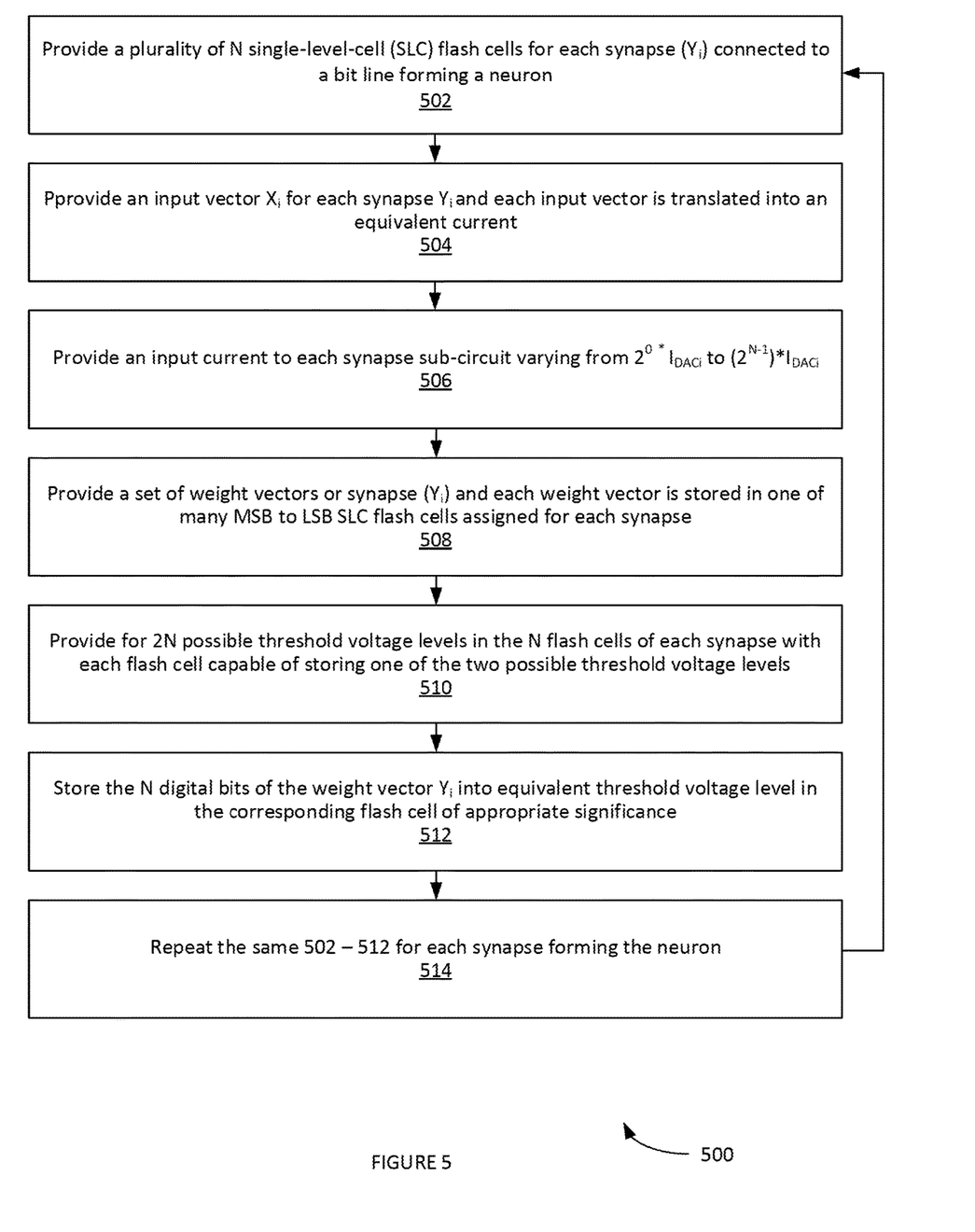
FIG. 5 illustrates another example process for operating neurons using single-level-cell (SLC) non-volatile memory cells and especially flash cells, according to some embodiments.

FIG. 5 illustrates another example process 500 for operating neurons using single-level cell (SLC) flash cells, according to some embodiments. In step 502, process 500 can provide a plurality of N single-level-cell (SLC) flash cells for each synapse ($Y_i$) connected to a bit line forming a neuron. The plurality of flash cells is ordered from a most significant bit (MSB) to a least significant bit (LSB). N is the number of bits in the weight vector or synapse $Y_i$.

In step 504, process 500 can provide an input vector $X_i$ for each synapse $Y_i$. Each input vector is translated into an equivalent current. In step 506, process 500 can provide an input current to each synapse sub-circuit varying from $2^0 * I_{DACi}$ to $(2^{N-1}) * I_{DACi}$.

In step 508 process 500 can provide a set of weight vectors or synapse ($Y_i$). Each weight vector is stored in one of many MSB to LSB SLC flash cells assigned for each synapse. In step 510, process 500 can provide for 2N possible threshold voltage levels in the N flash cells of each synapse with each flash cell capable of storing one of the two possible threshold voltage levels.

In step 512, process 500 can store the N digital bits of the weight vector $Y_i$ into equivalent threshold voltage level in the corresponding flash cell of appropriate significance (MSB to LSB). In step 514, process 500 can repeat the same 502-512 for each synapse forming the neuron.

It can be noted by those skilled in the art that input current $I_{DACi}$ can be replaced by input pulse $T_{PULSEi}$ and that flash cells can be replaced by other non-volatile memory cells having threshold voltage or resistance levels.

Figure 6:
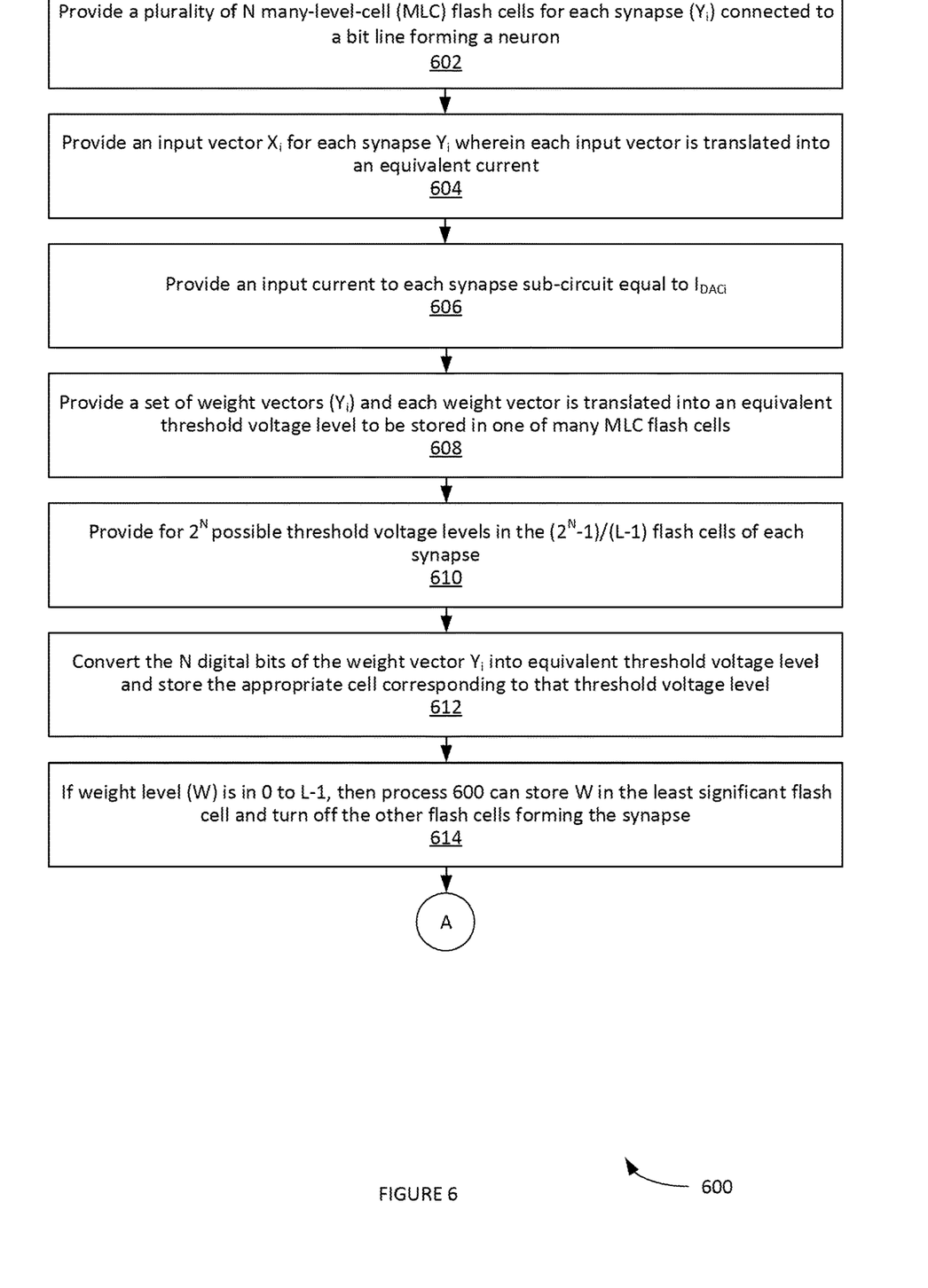
FIG. 6 illustrates an example process for improving weight resolution for analog or many-level-cell (MLC) non-volatile memory cells, and especially flash cell neurons, according to some embodiments, according to some embodiments.

FIG. 6 illustrates an example process 600 for improving weight resolution for analog or many-level-cell (MLC) flash cell synapses, according to some embodiments. In step 602, process 600 can provide a plurality of many-level-cell (MLC) flash cells for each synapse ($Y_i$) connected to a bit line forming a neuron. The plurality of flash cells is ordered from a most significant levels (MSL's) to a least significant levels (LSL's). N is the number of bits in the weight vector or synapse $Y_i$.

In step 604, process 600 can provide an input vector $X_i$ for each synapse $Y_i$ wherein each input vector is translated into an equivalent current. In step 606, process 600 can provide an input current to each synapse sub-circuit equal to $I_{DACi}$.

In step 608, process 600 can provide a set of weight vectors ($Y_i$). Each weight vector is translated into an equivalent threshold voltage level to be stored in one of many MLC flash cells assigned for each synapse. In step 610, process 600 can provide for $2^N$ possible threshold voltage levels in the $(2^N-1)/(L-1)$ flash cells of each synapse. Each flash cell capable of storing L possible threshold voltage levels, one of which is zero (cell off level).

In step 612, process 600 can convert the N digital bits of the weight vector $Y_i$ into equivalent threshold voltage level and store the appropriate cell corresponding to that threshold voltage level in one of the many SLC cells assigned to the weight vector or synapse $Y_i$.

In step 614, if weight level (W) is in 0 to L−1, then process 600 can store W in the least significant flash cell and turn off the other flash cells forming the synapse. In step 616, if weight level (W) is in L to 2(L−1), then process 600 can store L−1 in the first least significant flash cell, and W—(L−1) in the $2^{nd}$ least significant flash cell and store 0 level (cell turn off level) in the other flash cells forming the synapse. In step 618, if weight level (W) is in 2L−1 to 3(L−1), then process 600 can store L−1 in the first least significant flash cell, L−1 in the next least significant flash cell and W—2(L−1) in the $3^{rd}$ least significant flash cell and store level 0 (cell turn off level) in the other flash cells forming the synapse. In step 620, process 600 can repeat steps 614-618 based on the pattern till $Y_i$ synapse data is entered in the flash cells. In step 622, process 600 can repeat step 602 to 620 for each synapse forming the neuron.

It can be noted by those skilled in the art that input current $I_{DACi}$ can be replaced by input pulse $T_{PULSEi}$ and that flash cells can be replaced by other non-volatile memory cells having threshold voltage or resistance levels.

Figure 7:
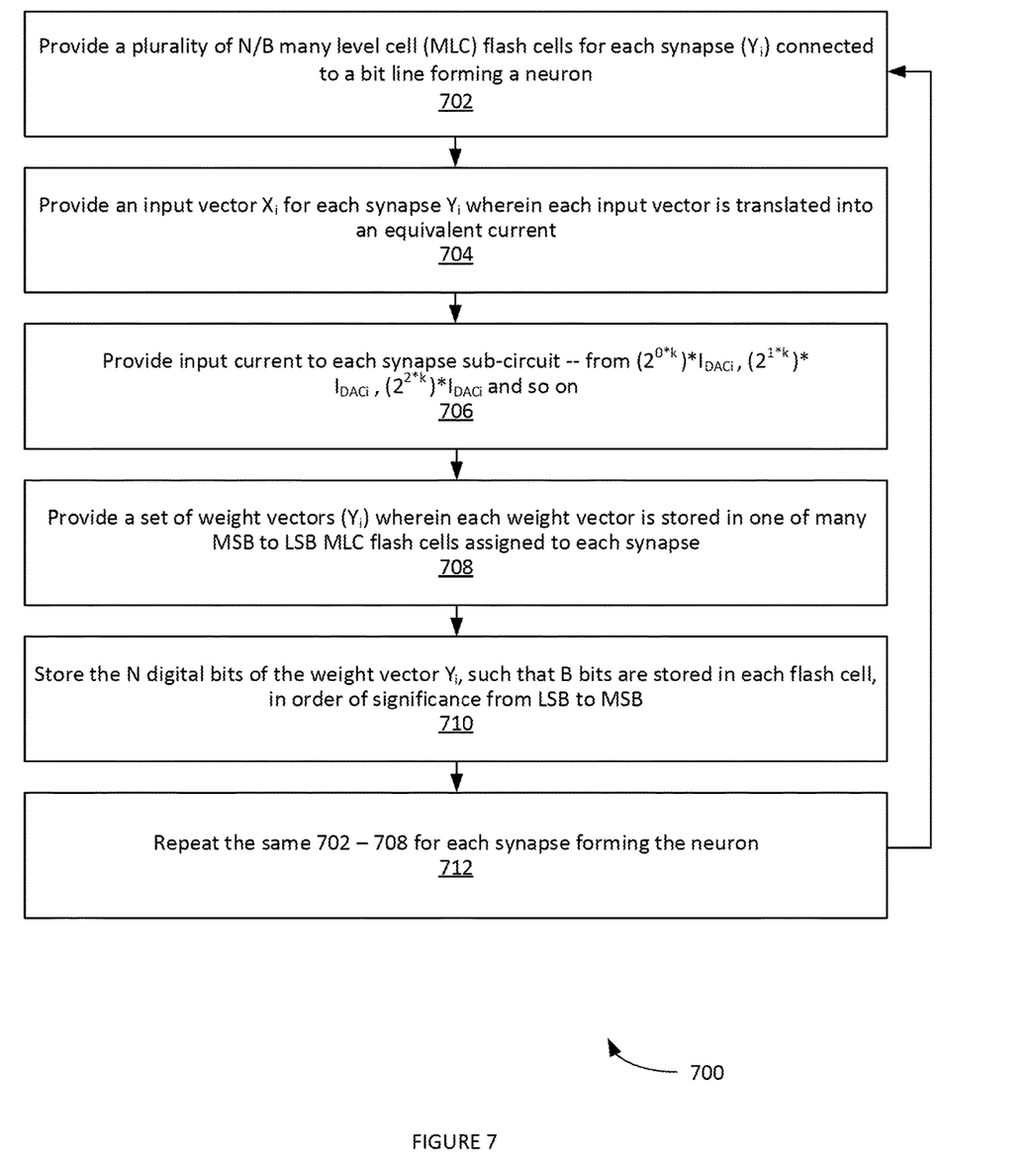
FIG. 7 illustrates a process for operating a set of analog or may-level-cell (MLC) non-volatile memory cells, and especially flash cells in a neuron, according to some embodiments.

FIG. 7 illustrates a process 700 for operating a set of MLC flash cells in a neuron, according to some embodiments. In step 702 process 700 can provide a plurality of N/B many level cell (MLC) flash cells for each synapse ($Y_i$) connected to a bit line forming a neuron. The plurality of flash cells is ordered from a most significant bit (MSB) to a least significant bit (LSB). N is the number of bits in the weight vector or synapse Yi and B is the bit storage per flash cell.

In step 704, process 700 can provide an input vector $X_i$ for each synapse $Y_i$ wherein each input vector is translated into an equivalent current. In step 706, process 700 can provide an input current to each synapse sub-circuit—from $(2^{0*k})*I_{DACi}, (2^{1*k})*I_{DACi}, (2^{2*k})*I_{DACi}$ and so on. Here $k=\log_2(L)$ and L is the number of levels possible per flash.

In step 708, process 700 can provide a set of weight vectors ($Y_i$) wherein each weight vector is stored in one of many MSB to LSB MLC flash cells assigned to each synapse. In step 710, process 700 can store the N digital bits of the weight vector $Y_i$, such that B bits are stored in each flash cell (B is number of bits that can be stored in a cell i.e. bit capacity of the cell) in order of significance from LSB to MSB. In step 712, process 700 can repeat the same 702-708 for each synapse forming the neuron.

It can be noted by those skilled in the art that input current $I_{DACi}$ can be replaced by input pulse $T_{PULSEi}$ and that flash cells can be replaced by other non-volatile memory cells having threshold voltage or resistance levels.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transistor form of machine-readable medium.

What is claimed is:

1. A method of operating a neuron circuit in a non-volatile memory-based neural array, the method comprising:
    providing a plurality of N many-level-cell (MLC) non-volatile memory cells for each synapse (Yi) connected to a bit line forming a neuron, wherein the plurality of non-volatile memory cells are ordered from a most significant levels (MSLs) to a least significant levels (LSLs), and wherein N is the number of bits in the weight vector of synapse (Yi);
    providing an input vector (Xi) for each synapse (Yi), wherein each input vector (Xi) is translated into an equivalent electrical signal ESi;
    providing an electrical signal to each synapse sub-circuit, the electrical signal comprising a set of input currents $((2^{\{0 \cdot k\}}) \cdot IDACi, (2^{\{1 \cdot k\}}) \cdot IDACi, (2^{\{2 \cdot k\}}) \cdot IDACi, \ldots)$, where $k=\log_2(L)$;
    providing a set of weight vectors, wherein each weight vector is translated into an equivalent threshold voltage level or resistance level to be stored in one of many MLC non-volatile memory cells assigned for each synapse;
    providing for $2^N$ possible threshold voltage levels or resistance levels in the $(2^N-1)/(L-1)$ non-volatile memory cells of each synapse, wherein each non-volatile memory cell is configured to store L possible threshold voltage levels or resistance levels, one of which is equivalent to an off state (0 state); and
    converting the N digital bits of the weight vector into equivalent threshold voltage level or resistance levels and store the appropriate cell corresponding to that level in one of a plurality of MLC non-volatile memory cells assigned to the weight vector or synapse (Yi).

2. The method of claim 1, wherein weight level (W) is stored in sequence from least significant levels non-volatile memory cell to most significant levels non-volatile memory cell in a sequential manner such as if weight level (W) falls within level 0 to L−1, then store W in the least significant levels non-volatile memory cell and turn off the other remaining non-volatile memory cells forming the synapse by storing level 0, which is equivalent to an off cell in the remaining non-volatile memory cells; if weight level (W) falls within level L to 2 (L−1), then store L−1 in the 1st least significant levels non-volatile memory cell, and W-(L−1) in the 2nd least significant levels non-volatile memory cell and turn off the remaining non-volatile memory cells forming the synapse by storing level 0; and to implement the process sequentially for various possible values of weight levels (W) per synapse.

3. The method of claim 1, wherein the step of providing an electrical signal to each synapse sub-circuit further comprises:
    providing an input current (IDACi) to each synapse sub-circuit.

4. The method of claim 1, wherein the step of providing an electrical signal to each synapse sub-circuit further comprises:
    providing an input pulse (TPULSEi) to each synapse sub-circuit.

5. A method of claim 1, wherein the non-volatile memory cell is a flash memory cell.

* * * * *